Figure 15:
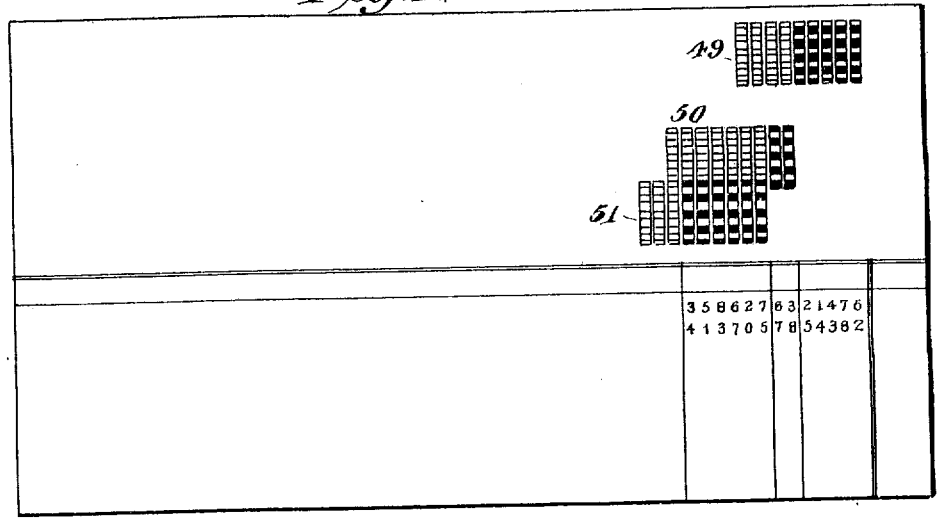

L. G. JULIHN.
COMBINED RECORDING AND CALCULATING MACHINE.
APPLICATION FILED MAR. 27, 1906.
903,866.
Patented Nov. 17, 1908.
9 SHEETS—SHEET 1.
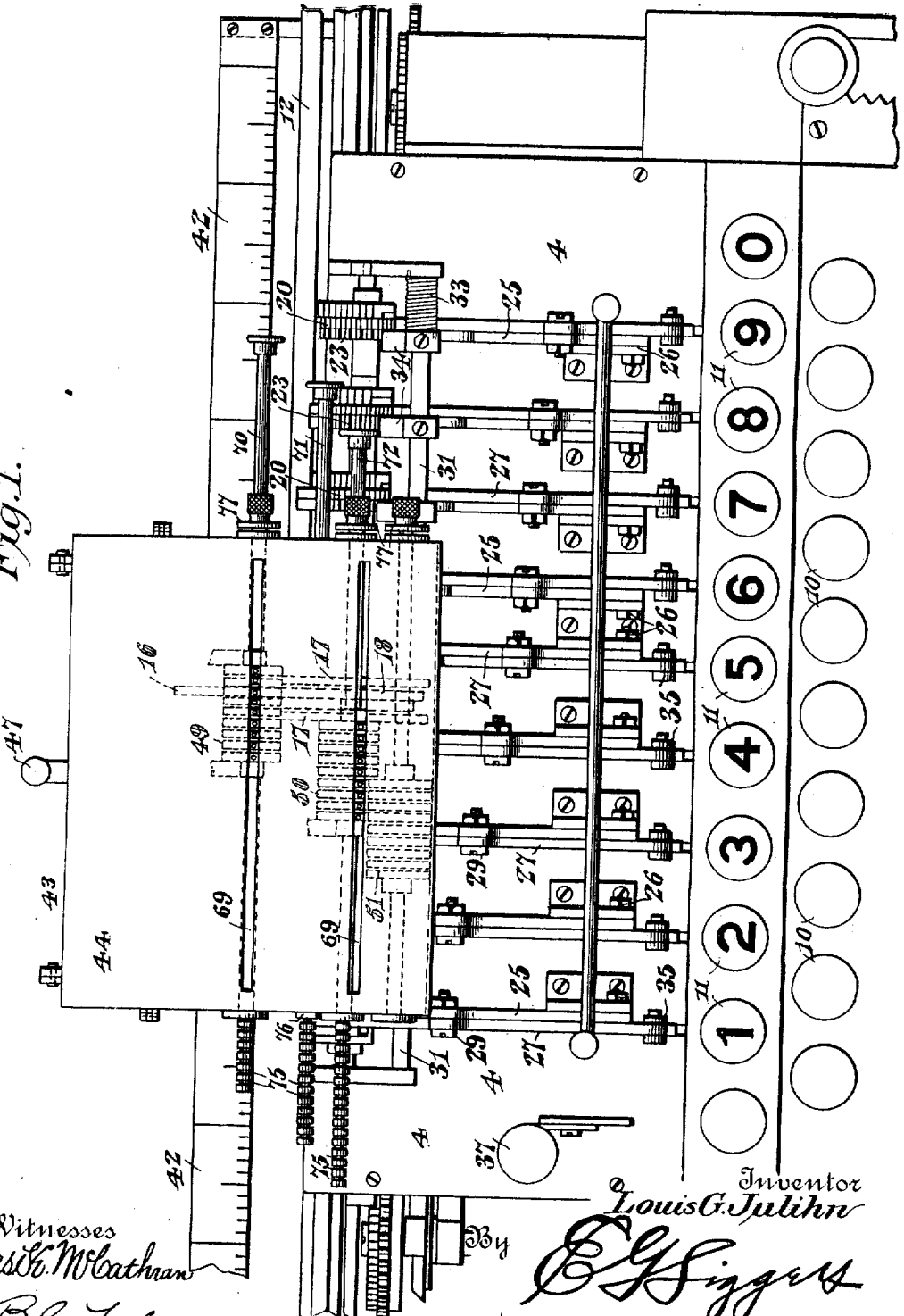
Witnesses
Jas. L. McCathran
B. G. Foster
Inventor
Louis G. Julihn
By C. G. Siggers
Attorney

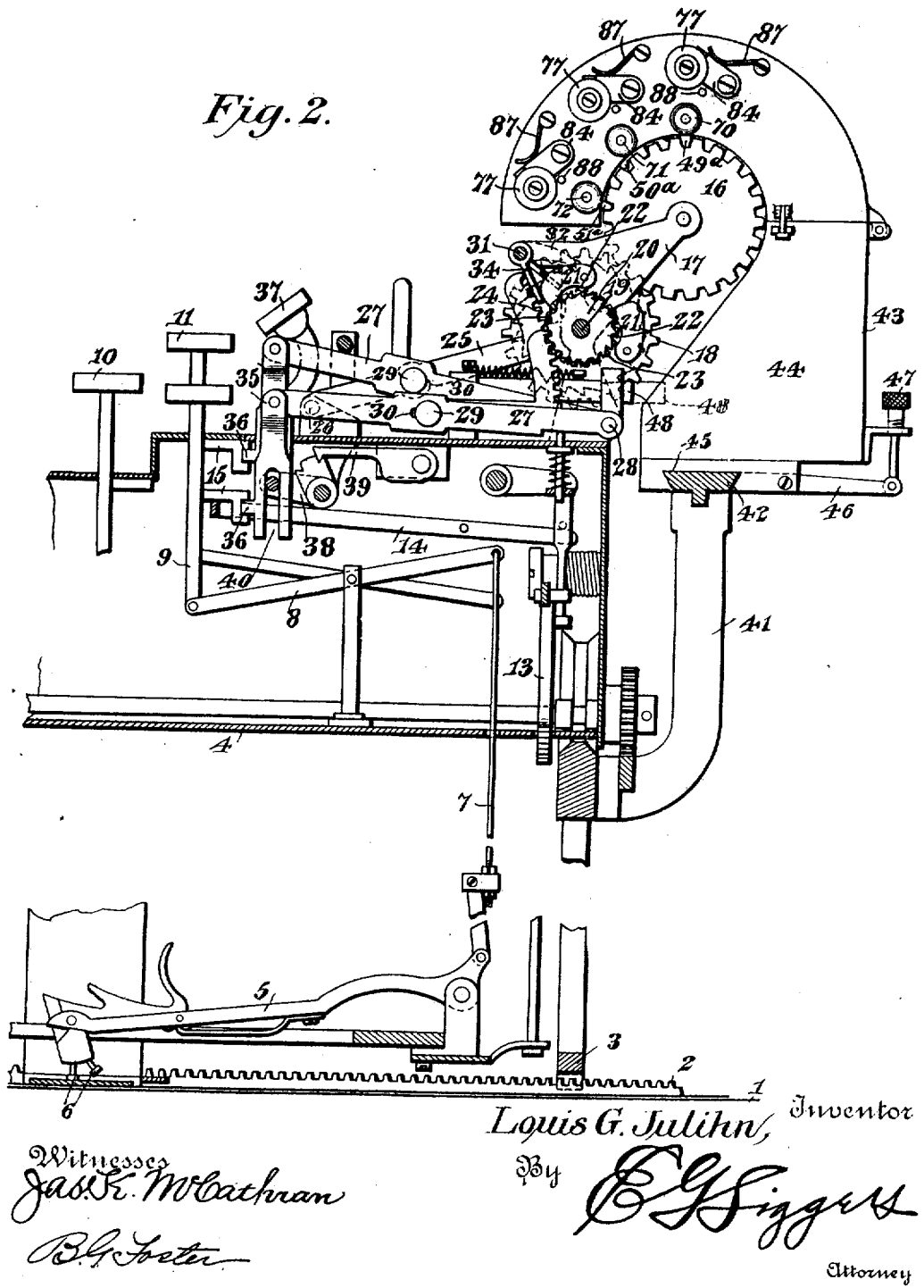

L. G. JULIHN.
COMBINED RECORDING AND CALCULATING MACHINE.
APPLICATION FILED MAR. 27, 1906.
903,866.
Patented Nov. 17, 1908.
9 SHEETS—SHEET 3.
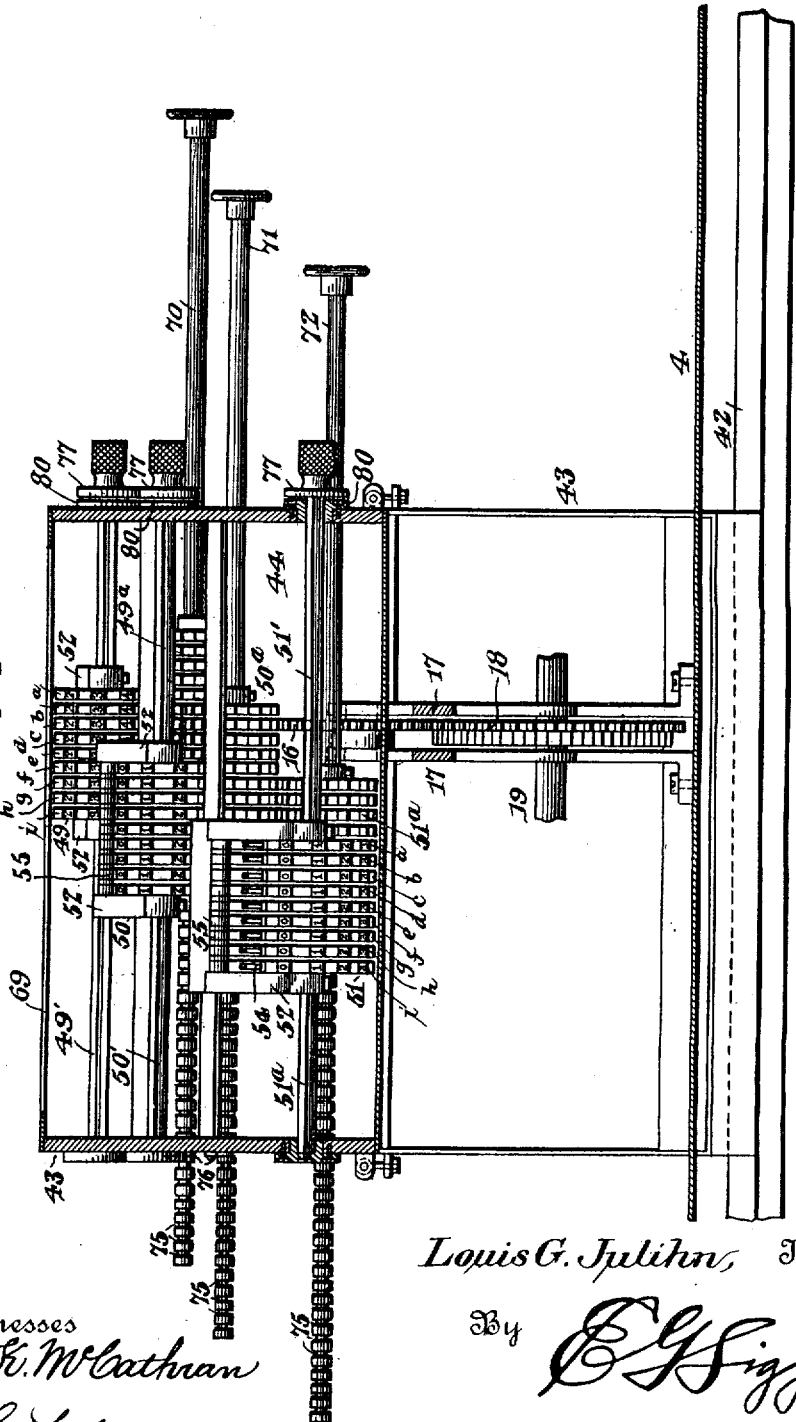
Witnesses
Jas. E. McCathran
B. G. Foster
Louis G. Julihn, Inventor
By E. G. Siggers
Attorney L. G. JULIHN.
COMBINED RECORDING AND CALCULATING MACHINE.
APPLICATION FILED MAR. 27, 1906.
903,866.
Patented Nov. 17, 1908.
9 SHEETS—SHEET 4.
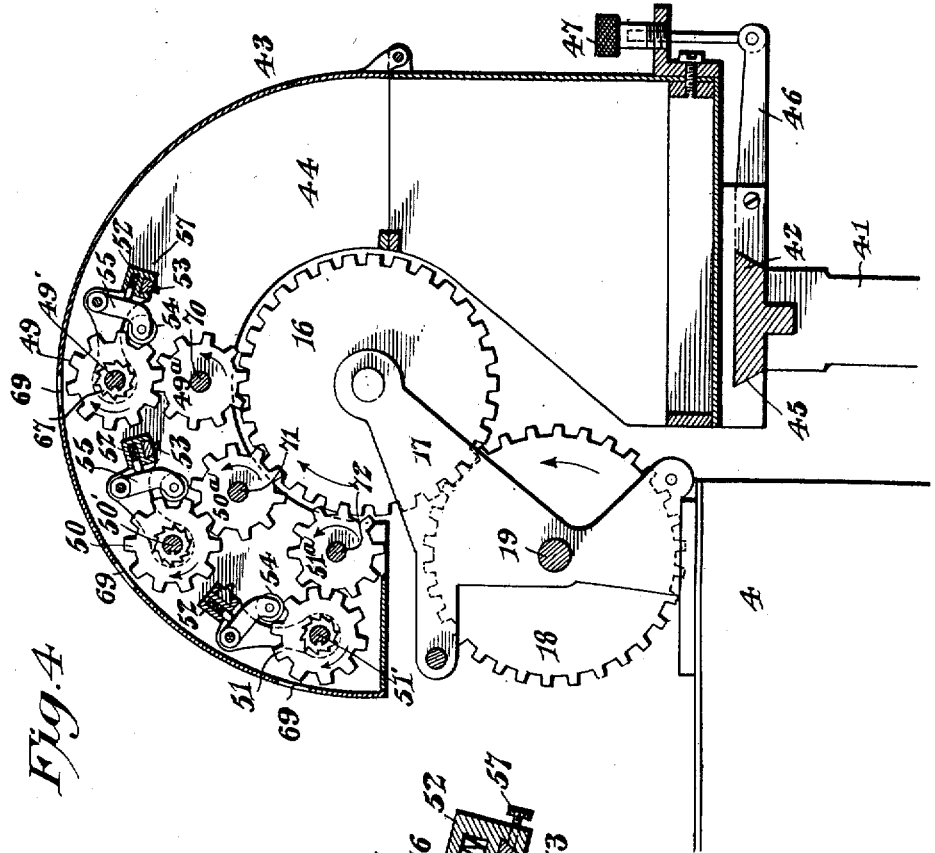
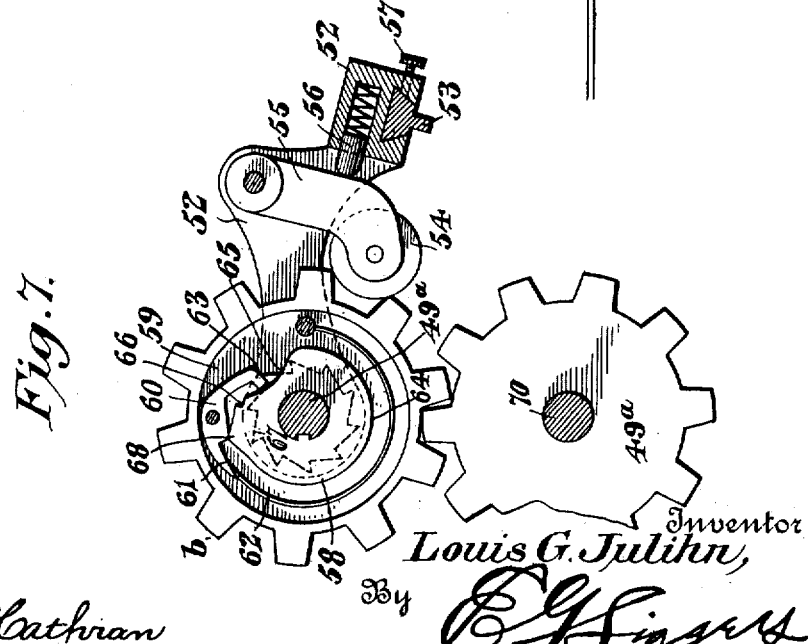
Witnesses
Jas. V. McCathran
B. G. Foster
Inventor
Louis G. Julihn
By E. G. Siggers
Attorney L. G. JULIHN.
COMBINED RECORDING AND CALCULATING MACHINE.
APPLICATION FILED MAR. 27, 1906.
903,866.
Patented Nov. 17, 1908.
9 SHEETS—SHEET 5.
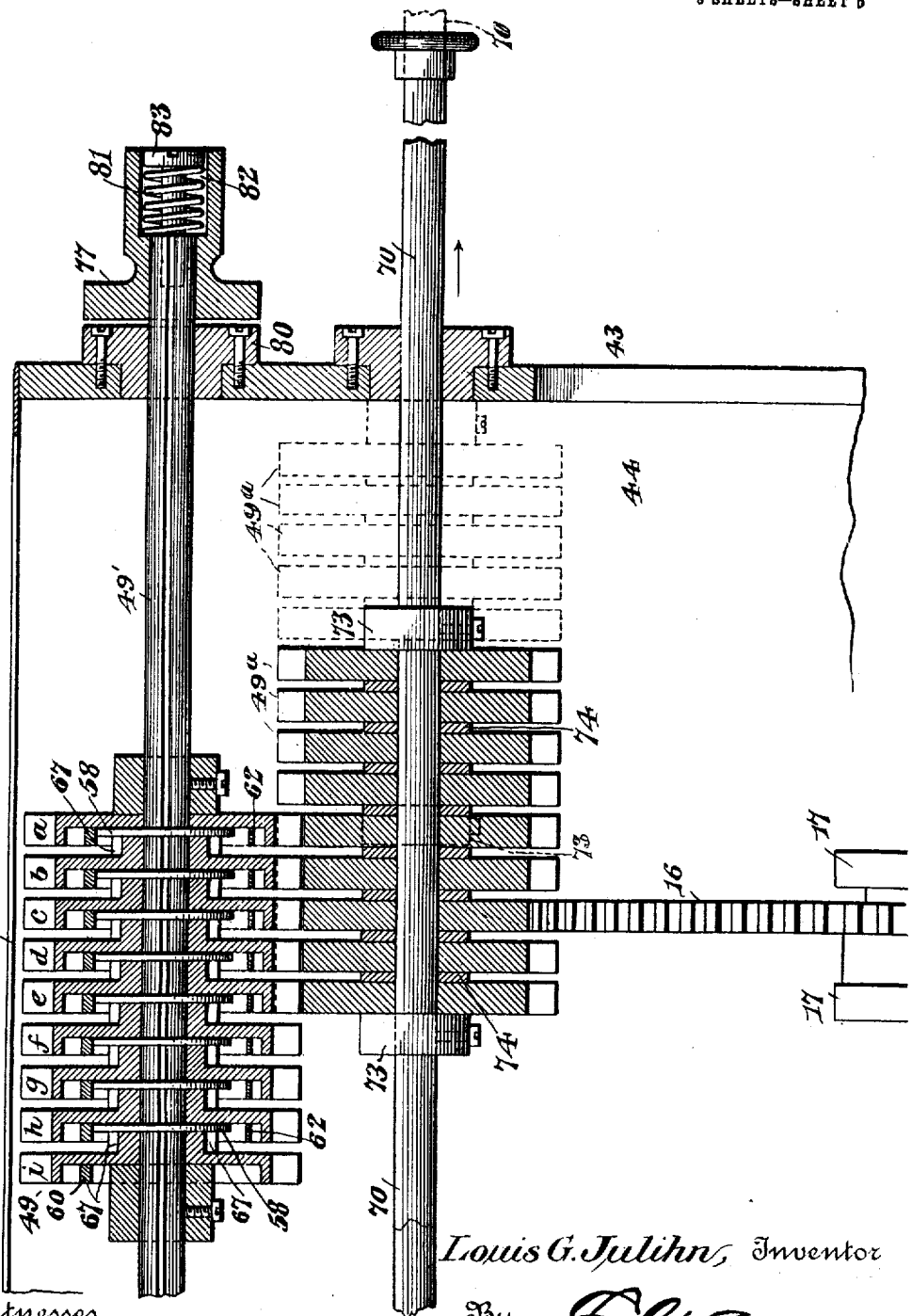
Louis G. Julihn, Inventor
Witnesses
Jas. F. McCathran
B. G. Foster
By E. G. Siggers
Attorney

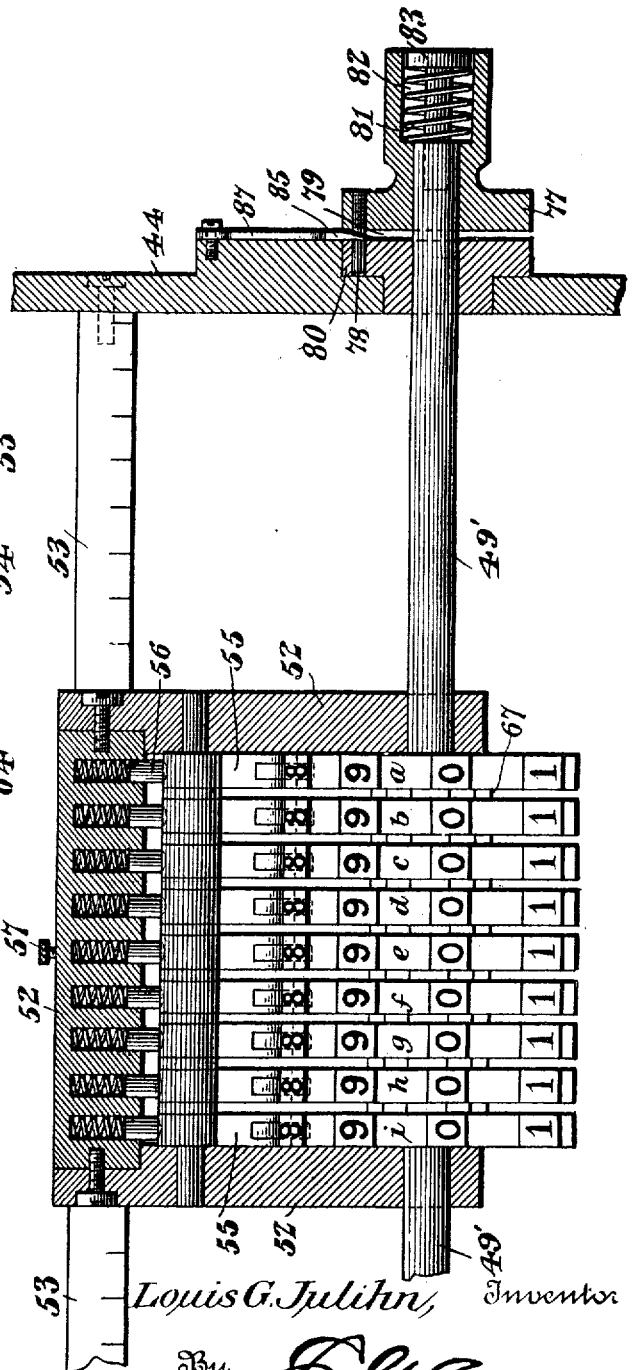

L. G. JULIHN.
COMBINED RECORDING AND CALCULATING MACHINE.
APPLICATION FILED MAR. 27, 1908.
903,866.
Patented Nov. 17, 1908.
9 SHEETS—SHEET 7.
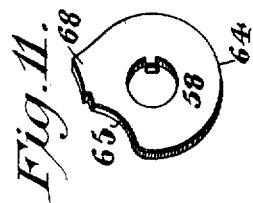
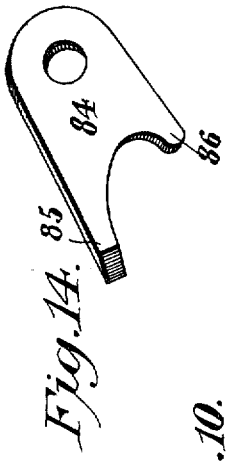
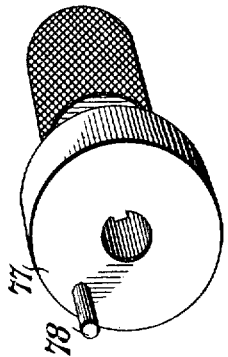
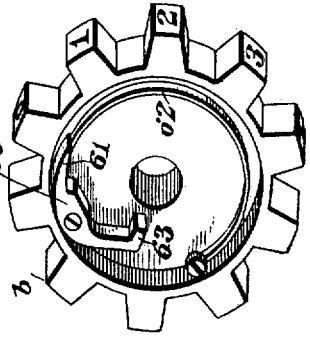
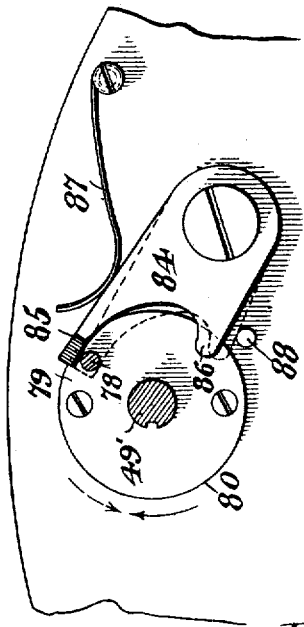
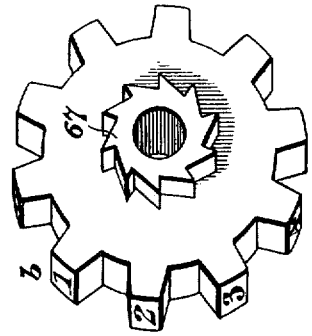
Louis G. Julihn, Inventor
Witnesses
Jas. F. McCathran
B. G. Foster
By C. G. Siggers
Attorney
THE NORRIS PETERS CO., WASHINGTON, D. C.

L. G. JULIHN.
COMBINED RECORDING AND CALCULATING MACHINE.
APPLICATION FILED MAR. 27, 1906.

903,866.

Patented Nov. 17, 1908.
9 SHEETS—SHEET 8.

Witnesses
Jas. F. McCathran
B. G. Foster

Louis G. Julihn,
Inventor

By E. G. Siggers
Attorney

L. G. JULIHN.
COMBINED RECORDING AND CALCULATING MACHINE.
APPLICATION FILED MAR. 27, 1906.
Patented Nov. 17, 1908.
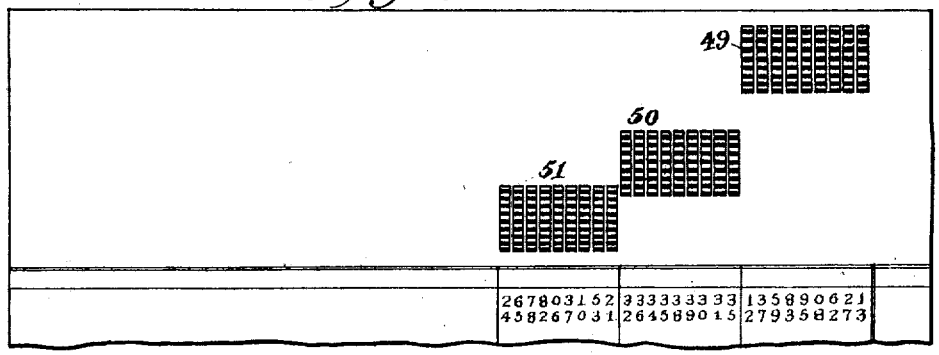
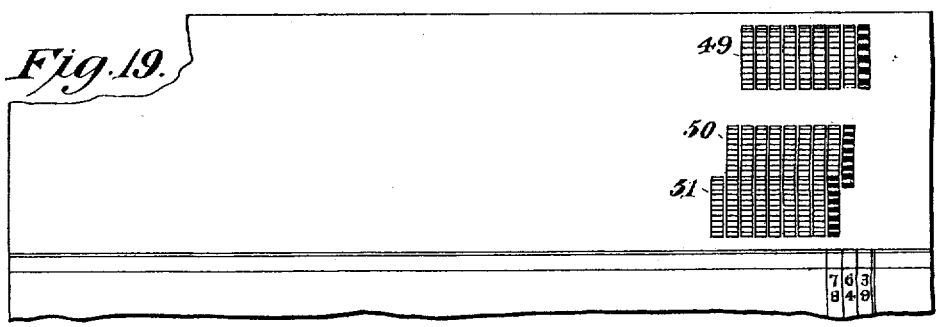
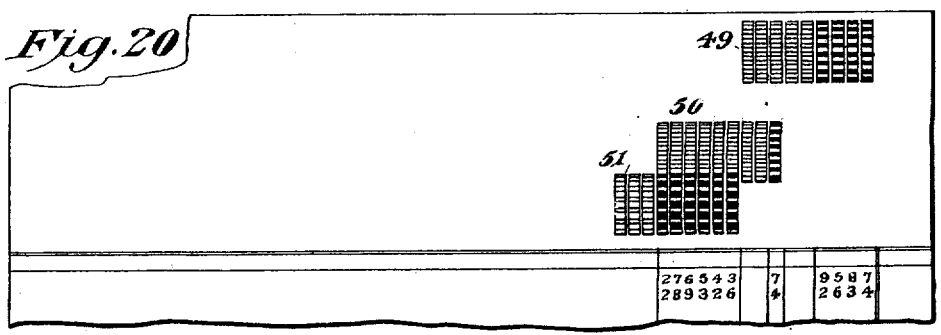
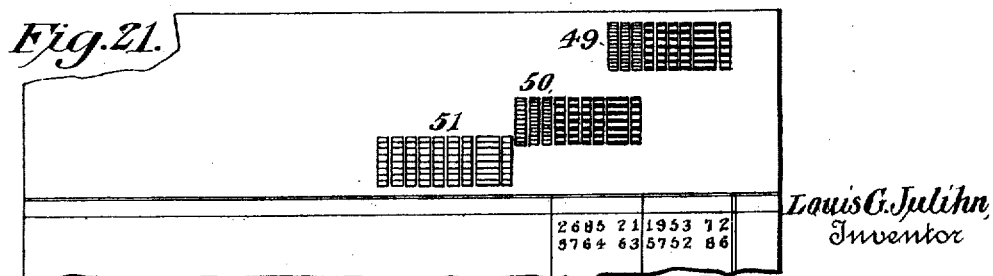
Louis G. Julihn, Inventor

UNITED STATES PATENT OFFICE.

LOUIS G. JULIHN, OF WASHINGTON, DISTRICT OF COLUMBIA, ASSIGNOR TO ELLIOTT-FISHER COMPANY, OF NEW YORK, N. Y., A CORPORATION OF DELAWARE.

COMBINED RECORDING AND CALCULATING MACHINE.

No. 903,866.      Specification of Letters Patent.      Patented Nov. 17, 1908.

Application filed March 27, 1906. Serial No. 308,280.

*To all whom it may concern:*

Be it known that I, LOUIS G. JULIHN, a citizen of the United States, residing at Washington, in the District of Columbia, have invented a new and useful Combined Recording and Calculating-Machine, of which the following is a specification.

My present invention relates to a combined recording and calculating machine, the illustrated embodiment thereof including a typewriting machine associated with a computing device operated from the typewriter keys, to effect a computation embracing values represented by the typewritten digits and to register the result of such computation.

The invention is directed, primarily, to the production of a machine for totalizing a plurality of narrow columns, especially such as are located in immediate juxtaposition, that is to say, columns separated by single lines or very narrow spaces.

To this end the computing device includes a plurality of totalizers so arranged that a master actuator, movable with the typewriter carriage, may operate the several totalizers in immediate succession, the ordinary letter space advance of the master wheel serving to move it out of coöperative relation with one totalizer and into coöperative relation with the next totalizer, so that the machine may be utilized to totalize a plurality of columns in immediate juxtaposition, that is to say, without more space between the columns than is ordinarily provided between the denominational orders of a given column.

A further object of the invention is to so arrange the totalizers that while a plurality of closely adjacent parallel columns may be separately totalized, each totalizer will be capable of computing and registering a total greatly in excess of the denominational capacity of the column to which said totalizer is appropriated.

To this end the totalizers are arranged in overlapping relation, and means, as for instance, idlers, are provided for establishing a coöperative relation between the master actuator and those denominational members or number wheels of the totalizers which correspond to the denominational orders of the several columns, the remaining number wheels of the totalizers having no direct connection with the operating means and being utilized merely as cumulating wheels designed to accommodate column totals of greater denominational value than the denominational capacities of the columns.

Another object is to provide for the totalizing of a plurality of closely adjacent columns of various widths.

To this end the totalizers are relatively adjustable so as to increase or diminish the overlapping thereof and each is equipped with a series of idlers which is also adjustable relative to its totalizer. By this means, the totalizers may be adjusted to correspond to the positions of the columns, and the several series of idlers may be adjusted so that any number of denominational members or number wheels of a given totalizer, corresponding to the number of denominational spaces of the column to be totalized by it, may be provided with coöperating idlers, the requisite number of denominational members or number wheels of the respective totalizers being thus arranged for operation by the master actuator according to the width or denominational capacities of the respective columns.

A further object is to provide an adjustable mounting common to all of the totalizers whereby the latter may be adjusted in unison opposite a particular portion of the work sheet and thereafter adjusted relatively in accordance with the precise locations of the columns to be totalized.

Other objects of the invention and various structural features will be hereinafter pointed out.

Figure 16:
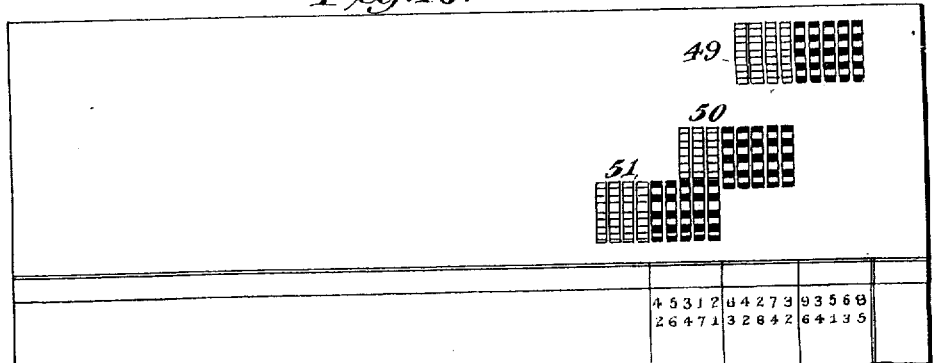
Figure 17:
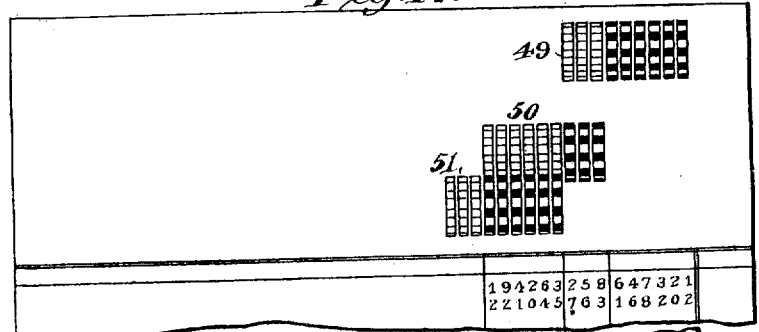

In the accompanying drawings—Figure 1 is a plan view of a portion of an Elliott-Fisher typewriter equipped in accordance with my invention. Fig. 2 is a sectional elevation of the structure shown in Fig. 1. Fig. 3 is a front elevation of the multi-column computing device and the master actuator, showing the casing and a portion of the supporting structure in section. Fig. 4 is a vertical section through the computing device, showing the master actuator and associated parts in elevation. Fig. 5 is an enlarged vertical section through the computing device, designed more particularly to show the relation between a totalizer and its idler group and the manner in which the master actuator operates the totalizer through the idlers. Fig. 6 is a sectional elevation of a totalizer and its supporting structure designed more particularly to show the manner in which the totalizer is mounted for adjustment within the computing device casing. Fig. 7 (Sheet 4) is a sectional elevation of a totalizer showing the carrying or transfer mechanism designed to transfer the amount accumulated upon a denominational member or number wheel to the number wheel of next higher order, the parts being shown in the positions they assume at the beginning of the carrying operation. Fig. 8 (Sheet 6) is a similar view with the parts in the positions they assume as the carrying operation is completed. Figs. 9 and 10 are perspective views showing the contiguous sides of two adjacent wheels. Fig. 11 is a perspective view of one of the resetting cams. Fig. 12 is an elevation partly in section, showing the position of one of the stop plates on the side of the casing and its relation to the adjacent number wheel shaft. Fig. 13 is a detail perspective view of one of the resetting heads. Fig. 14 is a detail perspective view of one of the stop plates. Fig. 15 is a diagrammatic view of one form of work sheet and the totalizers arranged to totalize gross weights, tare, and net weights, the active number wheels or those corresponding to the denominational orders of the columns being shown in heavy lines and the cumulating wheels being shown in comparatively light lines. Fig. 16 is a similar view of another form particularly adapted for the listing of telephone business. Fig. 17 shows another form and a different organization of the totalizers designed to compute list price, discount, and net price totals. Fig. 18 shows a population blank having wide columns requiring the use of the several totalizers at their maximum capacity. Fig. 19 is a view of a multiple tally with the several totalizers employed at their minimum capacity, each totalizer being capable of use as a detail adder. Fig. 20 is still another diagrammatic view, showing a form having several narrow columns with intervening spaces, and Fig. 21 shows a bill form with adjacent debit and credit columns arranged to be totalized by two of the totalizers, the third totalizer being entirely out of action.

*The typewriter.*—The typewriter illustrated in the accompanying drawings is the Elliott-Fisher billing and book machine of commerce, exemplified in Patent No. 573,868 issued to R. J. Fisher, Dec. 29, 1896 to which reference is made for a more complete disclosure of the typewriter structure than is thought necessary for the present purposes. In the use of this machine the work sheet is supported in a flat spread-out condition upon a flat platen 1 equipped with tracks or guides 2 upon which the machine frame 3 travels longitudinally of the platen to space the lines of writing. Mounted to travel transversely of the platen for letter spacing is a carriage 4 supported by the frame 3 and carrying the usual key-operated printing mechanism including downwardly swinging type bars 5 equipped with one or more type faces 6 and connected as by draw-wires 7 with key levers 8 fulcrumed in the hollow casing of the carriage 4. The key levers 8 are connected to the stems 9 of letter and numeral keys 10 and 11 exposed above the carriage casing for operation and displaying appropriate characters, as shown in Fig. 1.

The carriage 4 of the typewriter is drawn to the right, that is to say, in the direction of letter spacing, by suitable carriage propelling mechanism including tapes 12 connected at their inner ends to the carriage and at their outer ends to spring drums (not shown) mounted on the frame 3. The step-by-step movement of the printing mechanism in the direction of letter spacing is controlled by the keys 10 and 11 through the instrumentality of an escapement indicated generally at 13 in Fig. 2, and key yokes 14 operatively connected to the dogs of the escapement and arranged to be swung by pins 15 projecting from the stems 9 of the keys.

The yoke 14, which is operated by the numeral keys, is shown in Fig. 2, but the other yokes, which operate in substantially the same manner, are omitted from the drawings. By means of this arrangement the escapement dogs are shifted upon the depression of a key, and as the key returns to its normal position, after the printing of a character, the dogs resume their normal positions and in doing so, permit the carriage to advance one letter space to the right.

The mechanism thus far described is the ordinary typewriter construction and constitutes no part of my invention, except in so far as it may enter into novel combination with the mechanism to be described.

*The actuator and its operating connections.*—The master actuator or wheel 16 for the computing device, to be presently described, is rotatably mounted between a pair of brackets 17 which rise from the carriage 4 of the typewriter at the rear edge thereof. The master wheel is, therefore, movable laterally with the carriage to different denominational positions, that is to say, as the printing point of the typewriter advances to successive denominational positions with respect to a column of numbers being printed, the master wheel is correspondingly shifted. In addition to this lateral or denominational movement of the master wheel, it is designed to have variable rotative movement corresponding in extent to the various values of the numeral keys. To effect this variable movement of the master wheel, suitable driving connections are established between it and the numeral keys of the typewriter, these connections being so arranged that when the "1" key is depressed to print the digit "1", the master wheel will be rotated a single increment or unit of movement, the other numeral keys each serving to rotate the master wheel a number of such units or increments proportionate to the values of said keys. Also located between the brackets 17 is a driving wheel 18 meshing with the master wheel 16 and fixed upon a comparatively long driving shaft 19 mounted in suitable brackets, as shown.

Fixed to the shaft 19 are a series of driving ratchets 20 each adapted to be engaged by one of a series of driving pawls 21 carried by a series of driving arms 22 each having a toothed segment 23 arranged to be engaged by a toothed segment 24 formed at one end of a third-class lever 25 fulcrumed at its front end upon the carriage of the typewriter, as indicated at 26. Each lever 25 is operated for the purpose of swinging its driving arm by a second-class lever 27 fulcrumed at its rear end, as indicated at 28. The levers 27 are connected at their front ends to the numeral keys for actuation by the latter, and an operative connection between each lever 25 and the adjacent lever 27 is effected by means of a pin 29 extended from one lever and playing within a comparatively short longitudinal slot 30 in the other lever.

As the stroke of each key, regardless of its value, is the same, and as a positive connection is effected between each key and one of the levers 27, each of said levers will obviously have the same extent of movement or stroke. Therefore, as it is necessary for the several levers 25 to have different strokes according to the progressive values of the keys, the several slot and pin connections are disposed in graduated arrangement, as shown in Fig. 1. By this arrangement, the depression of each key will cause the driving arm operated thereby to be moved a distance proportionate to the value of the key, the pawl carried by the arm engaging the adjacent driving ratchet and imparting a corresponding rotary movement to the driving shaft 19, from whence it is transmitted through the driving wheel 18 to the master wheel 16. When the key is allowed to rise, the carriage will move forward to the next denominational position, as hereinbefore described, and the driving arm will swing back to its normal position without effecting reverse rotation of the driving shaft, since the driving pawl 21 will move idly over its ratchet.

Mounted in the brackets 17 rising from the carriage 4 is a universal check bar 31 provided with a check arm 32 disposed to engage the driving wheel 18, but normally retained out of engagement therewith by a spring 33 which yieldingly retains the check bar 31 in its normal position. Also extended from the bar 31 are a series of arms 34 each of which is disposed opposite a driving arm 22. As a driving arm completes its movement, it strikes one of the arms 34 and thus rocks the universal bar 31 to move the check arm 32 into engagement with the driving wheel 18 to positively arrest the movement of the latter at the proper point. The connection between the levers 27 and the numeral keys is effected by means of links 35 provided with lugs 36 which extend into notches in the pins 15 projecting from the key stems 9. In order to disconnect the operating connections of the computing device from the keys, the total key 37 is connected to a yoke 38 which engages slots 40 in the lower end of the links 35. The yoke 38 is held in either of its two positions by a detent 39.

While I have shown and described a preferable form of operating mechanism for the computing device, it should be understood that I make no claim to the specific mechanism shown for operating the wheel 18 from the keys 11, and so far as this invention is concerned, motion may be transmitted to the master actuator of the computing device in any of the various ways known in the art. In fact, the master wheel operating connections are shown only in a general way, no effort having been made to fully show and describe the various details, except such as are necessary to produce an operative structure.

*The multi-column totalizer.*—Carried at the rear of the machine frame 3 are brackets 41 upon which is carried the supporting and guiding bar 42 for the multi-column totalizer 43. The casing 44 of the mechanism 43 is provided at its bottom with a guide groove 45 for the reception of the bar 42, and with a locking lever 46 operated by a thumb screw 47 to engage the bar 42. The casing may thus be shifted along the bar 42 to dispose it in various positions with reference to the work sheet, and it may then be locked securely upon its support. To facilitate this adjustment of the computing mechanism, a spring-actuated sliding stop 48 is mounted on the carriage 4. The carriage is first positioned with respect to the work sheet, the stop 48 is then projected rearwardly, as indicated in dotted lines in Fig. 2, and the computing device is then moved along the bar 42 until arrested by the stop 48. The adjustment of the computing mechanism is further facilitated by graduating the bar 42, as shown in Fig. 1, in correspondence with the graduations on the scale bar of the typewriter.

The upper portion of the casing 44 is of substantially semi-circular form, as shown in Fig. 2, and is concentric with the master wheel 16, so that the latter is partially surrounded by the casing, but is unobstructed thereby when moved laterally with the typewriter carriage. Within the upper front portion of the casing 44 are arranged a series of column computing devices or totalizers 49, 50 and 51 each including a series of number wheels, digit carriers, or denominational members $a$, $b$, $c$, $d$, $e$, $f$, $g$, $h$ and $i$, revolubly mounted on one of the number wheel shafts 49', 50' or 51'. Each series of number wheels is confined within an adjustable carriage 52 slidably supported at its front end by the number wheel shaft, see Fig. 6, and at its rear end by a guide bar 53, Figs. 6 and 8, extending between the side walls of the casing 44. Within each frame or carriage 52 is mounted a series of locators 54 for the adjacent number wheels, these locators being preferably in the form of rollers carried by swinging arms 55 urged toward the wheels by spring-pressed plungers 56 mounted in the frame. Normally each of the locators engages adjacent teeth of a number wheel, as shown in Fig. 7, and retains the wheel accurately in position.

Each totalizer frame or carriage 52 is adjustable within the casing 44, the bars 53 being graduated, as shown in Fig. 6, to aid in locating the carriages accurately, and each carriage being provided with a clamping screw 57 arranged to frictionally engage the adjacent bar 53 to hold the carriage in the position to which it has been adjusted.

*The carrying mechanism.*—Each of the totalizers 49, 50 and 51 is provided with suitable carrying mechanism by means of which when the limit of value of a given denomination is reached, such value will be transferred to the denominational member or number wheel of next higher order. This carrying mechanism may be of any approved form, as for instance, that shown more particularly in Figs. 5, 7, 8, 9, 10 and 11.

Upon each number wheel shaft 49', 50' or 51' are splined a series of substantially disk-shaped transfer cams 58 one of which is located within the recessed side face of each number wheel, with the exception of the wheel $i$ of highest order, see Fig. 5. Each wheel, with this exception, is provided upon the bottom face 59 of its recess with a pivoted transfer pawl 60 having a tail piece 61 urged outwardly by a flat spring 62 and formed at its opposite end with a beak 63.

The major portion 64 of each transfer cam is concentric with the number wheel shaft, but between the opposite ends of this plain portion 64 of the cam is formed a depression 65 at one end of which is defined an angular resetting notch 66, the relation of each transfer pawl to its cam, when the wheel carrying the pawl is registering "0" being shown in Fig. 8. Assuming the wheel shown in this figure to be the wheel $b$ to the right of the wheel $a$, it will be seen that the rotation of the latter in the direction of the arrow will cause the beak 63 of its transfer pawl to ride upon the plain face 64 of the cam during eight increments of movement of the wheel $a$, that is to say, while the numbers "1" to "8" are successively presented at the reading line. At the end of the eighth increment of movement, the beak of the pawl will drop into the resetting notch 66 and during the next or ninth increment of movement, which presents the digit "9" of the wheel $a$ at the reading line, the beak of the pawl will travel down into the depression 65 of the cam to engage a tooth of a ratchet wheel 67 formed upon the adjacent side face of the number wheel $b$ of next higher order, see Fig. 9. Thus an engagement will be effected between the two wheels $a$ and $b$, the elements of the transfer mechanism then occupying the positions shown in Fig. 7. As the final or tenth increment of movement is imparted to the wheel $a$, the engagement of its pawl with the ratchet of the next wheel $b$ will cause a corresponding increment of movement to be imparted to said wheel $b$ for the purpose of transferring to the latter the value accumulated upon the wheel $a$, as is well understood in the art.

Although the spring 62 would probably be effective to insure the engagement of the pawl with the ratchet at the proper time, such engagement is insured by providing the transfer cam 58 with a slight swell or projection 68 which, by engagement with the tail piece of the pawl 60, causes the latter to move positively into engagement with that tooth of the adjacent ratchet which is exposed opposite the depression 65 in the cam 58, as shown in Fig. 7, it being noted that the cam is of sufficient diameter to hold the pawl out of engagement with the adjacent ratchet, except during that movement of the pawl which is utilized to effect the carrying of the next wheel.

*The selective mechanism.*—By reference to Fig. 4, it will be seen that the several totalizers are distributed about the axis of the number wheel 16. That is to say, the axes of the several totalizers are intersected by an arc struck from the axis of the master wheel as a center, and it will also be noted that these totalizers are located in the forward part of the casing 44 so that the reading line of each totalizer may be observed, through one of the sight openings 69 in the casing 44, by the operator of the machine. The totalizers, however, are spaced from the master wheel to permit the interposition of selective mechanism in the form of idlers arranged in three series 49$^a$, 50$^a$ and 51$^a$, each series being interposed between a totalizer and the master wheel 16, as shown in Fig. 4. The several series of idlers are loosely mounted upon idler bars 70, 71 and 72, extending through the casing 44 of the computing device, as shown in Fig. 3.

Each series of idlers corresponds in number with the denominational members of a totalizer, each idler shaft being provided with collars 73 confining the series of idlers and the several idlers of a series being spaced apart by spacing rings 74, so that when a series of idlers is presented opposite a totalizer, each number wheel of the latter will be engaged by an idler.

It will be noted, see particularly Fig. 5, that as the master wheel 16 does not directly engage the number wheels, but operates the latter through the medium of the idlers, it is possible to control or select the number of number wheels which will be operated by the master wheel, by shifting the interposed series of idlers relative to the totalizer for the purpose of placing any desired number of idlers in mesh with the number wheels. For instance, with the parts adjusted as shown in Fig. 5, the master wheel 16 is only capable of operating the totalizer 49 when said master wheel is opposite the five number wheels of lowest order, that is to say, when the master wheel is in one of five denominational positions ranging from units to ten-thousands. Assuming, therefore, that the machine is being utilized to compute the total of a column only five denominations wide, it will be seen that the totalizer will be operated by the master wheel whenever a number is printed in such column and not otherwise, although the computing device is capable of computing and registering a total in excess of the capacity of the column, since the four number wheels $f$, $g$, $h$, and $i$ to the left of the series of idlers constitute cumulating wheels. Thus, while the largest number capable of being printed in the column will be 99,999, the computing device is capable of registering a column total of 999,999,999. If the column to be computed is only four positions wide, instead of five, as shown in Fig. 5, it is simply necessary to shift the idler bar 70 to the right or in the direction of the arrow, so that only four number wheels will be selected or served by idlers. Thus it will be seen that by shifting the series of idlers, all of the number wheels, or any number of them, may be disposed for actuation by the master wheel, according to the width of the particular column to be totalized.

To facilitate the adjustment of each idler bar and its retention in its adjusted position, said bar is provided at its left hand end with a series of equi-distant notches 75 designed to be engaged by a detent 76 mounted on the left hand side of the casing 44.

It will be observed that each idler bar and each of the several detents are of identical construction, and that each totalizer and its series of idlers are related in the manner above described.

*The arrangement for totalizing adjacent narrow columns.*—We have now seen how provision is made for computing a total greatly in excess of the capacity of the column without danger of operating the computing device when a number is printed outside of the column but adjacent thereto, and while this is believed to be novel, the invention is primarily directed, as heretofore stated, to the production of a computing device for totalizing a plurality of columns in immediate juxtaposition, regardless of the positions of such columns on the work sheet and likewise regardless of the relative widths of the columns. It is for this reason that the totalizers are so mounted that they are relatively adjustable past one another, or in overlapping relation, notwithstanding their disposal for operation by a common actuator. Suppose, for instance, that it is desired to totalize three columns separated by single lines, each column being five denominations wide, and all three columns being embraced within fifteen ordinary letter spaces, that is to say, the space between the lowest order of one column and the highest order of the next column being no greater than the space between two denominations of the same column, see Fig. 16. In this event, the computing device as a whole will be shifted along the bar 42 until the units wheel $a$ of the computing device 49 occupies a denominational position corresponding to that of the units order of the right hand column. The computing device 50 will now be shifted within the casing 44 until its wheel $a$ corresponding to the units order of the middle column, in which position the totalizer will be secured by the manipulation of the screw 57. The third totalizer 51 will then be similarly shifted into proper relation to the left hand column and secured, see Fig. 3. Now, as it is not desired to have the master wheel operate any computing device when the printing point of the typewriter is located outside of a column to be totalized by such device, each of the idler bars 70, 71 and 72 is shifted endwise to provide the five lowest or right hand wheels of each computing device with idlers.

As the printing mechanism of the typewriter moves toward the right and approaches the columns on the work sheet, numbers may be printed without danger of operating any of the computing devices, because, while the master wheel may be located opposite any one of the four highest wheels of the computing device 51, such wheels are not provided with idlers, and therefore even though the master wheel may be rotated, such movement will be entirely ineffective. As soon, however, as the printing point of the typewriter moves to a position opposite the highest order or denominational position of the left hand column, the master wheel 16 will move into mesh with the idler serving the number wheel $e$ of the totalizer 51, and said number wheel will, therefore, be operated by the master wheel a number of increments corresponding to the value of the digit printed. As the printing point of the machine advances across the left hand column, to print the remaining digits of the number, the remaining number wheels of the totalizer 51 will be correspondingly operated, and although the master wheel will be opposite certain of the number wheels of the middle computing device 50 the operation of said wheels will not be effected, because they are not equipped with idlers.

As the master wheel moves out of engagement with the idler serving the wheel *a* of the computing device 51, it will move into engagement with the idler serving the number wheel *e* of the middle totalizer 50. If now, the numeral key is depressed, a digit will be printed in the highest order or position of the middle column, and the corresponding denominational member or wheel *e* of the computing device 50 will be operated. As the remaining digits of the number are printed in the middle column, the remaining number wheels of the totalizer 50 will be operated in an obvious manner without causing the operation of the totalizer 49, and as the master wheel moves out of engagement with the idler serving the lowest wheel of the totalizer 50, it will move into engagement with the idler serving the wheel *e* of the totalizer 49, and the latter will be operated as a number is being printed in the right hand column. By this arrangement, three narrow columns in immediate juxtaposition may be totalized without causing any totalizer to be operated except when the printing point of the machine is opposite the column served by it, and this notwithstanding the fact that the master wheel is located opposite certain number wheels of a given totalizer when the machine is operating outside of the column served by such totalizer. In addition to this capability, the values of the column totals capable of being computed are unlimited, except by the capacities of the totalizers, regardless of the widths of the columns, the minimum column width being one letter space and the maximum column total, in the illustrated embodiment of the invention, being 999,999,999, although obviously the capacity of the totalizers may be increased indefinitely by providing additional number wheels.

*Reorganization of the mechanism for different classes of work.*—With the parts adjusted as shown in Fig. 3, the device is adapted for the computation of three columns each five positions or orders wide, as already stated, but it is obvious that narrower or wider columns may be provided for by effecting the relative adjustment of the totalizers and by shifting the idler bars for the purpose of presenting idlers to any desired number of wheels of each totalizer. Similarly, it is immaterial whether or not the columns are of the same width, as either column may be of any width within the capacity of the totalizer appropriated to it. Nor is the machine restricted to the totalizing of immediately adjacent columns, since the totalizers may be relatively adjusted so as to produce comparatively wide spaces between the columns, or so as to provide for totalizing two columns in immediate juxtaposition and a third column located at a comparatively remote point. So also, it is possible to utilize any of the totalizers independently of the other or others, since any totalizer may be rendered entirely inoperative by withdrawing its series of idlers from all the wheels, as indicated in dotted lines in Fig. 5.

*The number wheel resetting mechanism.*—The number wheels of each totalizer are reset to zero by the following instrumentalities, after a given computation has been completed. Fixed upon the end of each number wheel shaft beyond the right hand end of the casing 44 is a resetting head 77 provided with a stop pin 78 disposed eccentric to the shaft and designed to engage a recess 79 in the adjacent bearing collar or bushing 80 of the shaft. The stop pin 78 is normally held in engagement with its recess, to prevent the rotation of the shaft, by the spring 81 located within a cylindrical recess 82 in the outer end of the head 77 and bearing at one end against the bottom of the recess and at its opposite end against the head 83 of a screw secured in the end of the number wheel shaft. Normally, therefore, the shaft is held by the pin 78 against rotary movement.

When it is desired to reset the number wheels, the head 77 is drawn back against the resistance of the spring 81 to withdraw the stop pin from its recess. The head is then rotated to effect the rotation of the shaft and transfer cams until each wheel is picked up by the engagement of its pawl with the resetting notch 66 of a cam 58. Since the resetting notches of the several cams 58 are accurately alined, and since the several pawls bear an identical relation to the wheels, the engagement of the resetting notches with the beaks of the pawls will present the similar digits of the several number wheels in alinement. This result will be effected by one complete rotation of the number wheel shaft, but as the starting positions of the pawls are two increments of movement removed from the resetting notches, see Fig. 8, the shaft is given more than a complete rotation, so that the resetting notches may be moved a sufficient distance to properly position the pawls and to present the several number wheels at zero, after which the shaft is turned back to present the resetting notches two increments in rear of the beaks of the pawls.

The manipulation of the shaft is facilitated by a check-plate 84, see Fig. 12, pivotally mounted upon the side of the casing 44 and bifurcated to form a guard 85 and a check-finger 86. In the normal position of the plate 84 the guard 85 rests against the pin 78, see full line position, Fig. 12, but when the resetting head 77 is drawn back, the pin 78 is removed from its recess and from the plate 84, and said plate is swung by a spring 87 to present the guard 85 over the recess 79, the movement of the plate being limited by a stop 88, see dotted position of the plate in Fig. 12. The head, having been drawn back, is now rotated in the direction indicated by the arrow in Fig. 12 to cause the transfer cams to pick up the pawls and thus connect the wheels with the number wheel shaft. When the stop pin 78 again arrives opposite its recess 79, it will ride over the guard 85 instead of entering the recess, and will not be arrested until it contacts with the check-finger 86. In this position of the parts, the number wheels will have been completely reset, and each will be displaying zero before the sight opening in the casing 44, but the resetting notches of the transfer cams 58 will be two increments in advance of their normal positions. The number wheel shaft is therefore rotated in the reverse direction, indicated by the dotted arrow in Fig. 12, the pin 78 contacting with the under edge of the guard 85. The plate 84 will thus be swung to move the guard 85 from over the recess 79, so that, when the pin 78 reaches the recess it will enter the latter as the spring 81 urges the resetting head 77 toward the casing 44 to lock the number wheel shaft at the completion of the resetting operation.

It will be understood that resetting mechanism of the character described is provided for each of the totalizers so that any totalizer may be reset independently of the others.

*Brief summary.*—It may be pointed out briefly that the illustrated machine includes as units a multi-column computing device adjustable on the machine frame, and key-operated actuating mechanism therefor mounted on the relatively movable carriage, so that, as the printing point of the carriage advances from one denominational order or position to the next, the master wheel will similarly advance from one number wheel to the next of a totalizer so that the denominational position of the printing mechanism, relative to a column on the work sheet, will always be in correspondence with the denominational position of the master wheel with respect to the totalizer arranged to totalize such column. It will also be seen that the several totalizers of the computing device are so arranged that while they may overlap one another and thus present number wheels of several totalizers opposite the master wheel in a given position of the latter, said master wheel will, nevertheless, effect the operation of only that computing device appropriated to the particular column opposite which the printing point of the machine is located. Furthermore, each series of idlers constitutes selective means for rendering any desired number of wheels of a given totalizer operative by the master means, the remaining number wheels serving merely as cumulating wheels in case the column total requires a greater number of denominational positions, or is of greater denomination then is comprehended by the width of the column being totalized, the master wheel being incapable of operating the cumulating wheels, even though it be in proper denominational position to operate the same but for the fact that the adjustment of the selective mechanism renders said wheels inoperative by the actuator except through the medium of the carrying mechanism.

By reference to Figs. 15 to 21, inclusive, of the drawings, some idea may be gained of the wide range of usefulness of the machine, the relative adjustment of the totalizers with respect to each other, and the relative adjustment of each series of idlers with respect to its totalizer, making it possible to compute the totals of several columns which may or may not be in immediate juxtaposition and any or all of which may be of any width within the capacity of the respective totalizers. It will furthermore be seen, particularly by reference to Fig. 21, that when employing forms or blanks having less than three columns, one of the totalizers may be placed entirely out of action by withdrawing its idlers from the number wheels, and it is obviously possible to throw any one, two, or all of the totalizers out of use by withdrawing any set or sets of idlers when necessary. Furthermore, if it is desired to compute decimal fractions, one wheel of any or each of the totalizers, as for instance, the wheel *b*, may be made of double width to provide for the decimal space, in a manner well understood in the art and indicated in Fig. 21. In this way all the totalizers may be used to compute money values, for instance, or certain of them money values and others quantity, weight, and the like, as for instance, in making out bills, in which are itemized the number of articles, the weight and the cost, or gross weights, net weights, and cost, etc. Attention is further directed to the fact that while, in the illustrated mechanism, the totalizers are equidistant from the master wheel, it is possible to have the totalizers arranged at different distances from the wheel, although such arrangement is not preferable, for the reason that the several motion transmitting mechanisms could not be of uniform construction.

In the claims I have recited means for changing the denominational relation of the computing device or register and its operating means. This or equivalent language, when stated without further limitation, is intended to comprehend broadly any means whereby a coöperative relation may be established between the operating means and the particular member or number wheel, the denominational value of which corresponds to the denominational value of the digit to be added to the amount already in the register, whether this denominational selection is effected by the lateral movement of either the register or its operating mechanism, or both, or by some instrumentality requiring lateral movement of neither the registering nor operating units of the mechanism.

It is thought that the foregoing description, considered in connection with the accompanying drawings, will enable those skilled in the art to clearly comprehend the invention. Obviously, however, certain of the described features are capable of utilization in computing machines which are not adapted to record, or in connection with combined recording and computing machines involving recording mechanisms of various types, as for instance, different forms of typewriters. I therefore desire to reserve the right to effect such changes, modifications and variations of the illustrated structure as may come fairly within the scope of the protection prayed.

What I claim is:—

1. In a computing mechanism, a series of denominational members, operating means therefor, means for changing the denominational relation of the members and their operating means, carrying mechanism associated with the members, and selective mechanism arranged to operate the denominational members and variable to determine whether or not certain members will be operative by the operating means when the denominational relation of the parts is such as to permit the operation of said members.

2. In a computing mechanism, a unit including a series of denominational members, a second unit including operating means for the members, one of said units being laterally movable to change the denominational relation of the units, and means for determining whether or not certain members will be operated by the operating means when the relation of the units is such as to permit the operation of said members.

3. In a computing mechanism, a series of denominational members and carrying means for the members, selecting means for rendering any desired number of members operative, according to the width of the column, and a carriage movable to cause the establishment of a coöperative relation between the operating means and the selected members, the non-selected members being inoperative in all positions of the carriage except through the medium of the carrying mechanism.

4. In a computing mechanism, a series of denominational members, and a bodily shiftable series of idlers arranged to establish a coöperative relation between the master actuator and the denominational members.

5. In a computing mechanism, a series of denominational members, a master actuator, and an interposed endwise movable series of idlers each adapted when opposite a denominational member to transmit motion thereto from the actuator.

6. In a computing mechanism, a series of denominational members, a master actuator, an intermediate series of motion transmitting elements each adapted to transmit motion from the master actuator to a denominational member, means for shifting the series of motion transmitting elements relative to the denominational members, and a detent for the shifting means.

7. In a computing mechanism, the combination with a number wheel shaft, of a series of number wheels mounted thereon, carrying mechanism for transferring values from each wheel to the next wheel of higher order, a longitudinally shiftable idler rod disposed parallel with the number wheel shaft, a series of idlers mounted on the rod and movable therewith to engage the number wheels, and a master wheel adapted to operate the idlers in succession for the purpose of operating such of the number wheels as are engaged by the idlers.

8. The combination with a platen and printing mechanism, relatively movable, of computing mechanism including a series of denominational members, a master actuator, and means for establishing a coöperative relation between the master actuator and such only of the denominational members as correspond to the denominational positions of the column to be computed, the remaining members being inoperative by the actuator when the relation of the members and actuator would otherwise permit said remaining members to be operated.

9. The combination with a platen and printing mechanism, relatively movable to permit the printing of digits in different denominational positions, of a series of denominational members and a master actuator relatively movable to cause their denominational relation to correspond with the denominational relation of the platen and printing mechanism, and motion transmitting means interposed between the denominational members and the master actuator and variable to transmit motion to any desired number of denominational members according to the width of the column to be computed.

10. The combination with a stationary platen, of a typewriting machine frame mounted thereon, a carriage movable on the frame and supporting typewriting mechanism including numeral keys, a master wheel operatively related to the keys and movable with the carriage, computing mechanism including a series of denominational members mounted on the machine frame, and motion transmitting means interposed between the master wheel and the denominational members and variable to establish a coöperative relation between the master wheel and any desired number of denominational members.

11. The combination with a stationary platen, of a typewriter movably mounted thereon and including a machine frame, a carriage movable on the frame, printing mechanism mounted on the carriage and including numeral keys, computing mechanism mounted on the frame and including a series of number wheels, a master wheel movable with the carriage opposite the series of number wheels, means whereby the depression of any numeral key will cause a rotary movement of the master wheel corresponding in extent to the value of the key depressed, and idlers arranged to transmit motion from the master wheel to certain only of the number wheels whereby the remaining number wheels will serve as cumulating wheels but will not be affected by the movement of the master wheel when the latter is located opposite thereto.

12. The combination with a platen and printing mechanism, of computing mechanism including a series of denominational members and a series of motion transmitting elements adjustable in unison relative to the platen, said members and elements being relatively adjustable, and a master actuator coöperatively related to the printing mechanism of the typewriter and movable to operate the motion transmitting elements and thereby impart movement to one or more of the denominational members.

13. The combination with a plurality of computing devices arranged out of alinement and each including a series of denominational members and carrying means, of a master actuator common to said devices, said computing devices and actuator having relative lateral movement to change their denominational relation.

14. The combination with a plurality of relatively adjustable computing devices located out of alinement and each including a series of denominational members and carrying means, of a master actuator common to said devices.

15. The combination with a plurality of overlapping computing devices each including a series of denominational members and carrying means, of actuating mechanism for said devices.

16. The combination with a plurality of overlapping computing devices, relatively adjustable to vary the extent of their overlapping relation and each including an alined series of denominational members and carrying means, of a master actuator common to said computing devices.

17. The combination with a plurality of computing devices arranged out of alinement, a master actuator common to said devices, and independent motion transmitting mechanism interposed between each computing device and the master actuator.

18. The combination with a plurality of computing devices each including a series of denominational members and carrying means, of an actuator common to said devices, and motion transmitting mechanism interposed between the computing devices and the actuator and variable relative to said computing devices to vary the number of denominational members to which motion will be transmitted from the actuator.

19. The combination with a plurality of computing devices arranged out of alinement and relatively adjustable, each of said computing devices including a series of denominational members and carrying mechanism, a series of motion transmitting elements for each computing device, and a master actuator arranged to operate the computing devices through the medium of the motion transmitting elements, each computing device and its series of motion transmitting elements being relatively adjustable to vary the extent of their operative relation.

20. The combination with a plurality of overlapping computing devices relatively adjustable to vary the extent of their overlapping relation, each of said computing devices including a series of denominational members and carrying mechanism, a series of motion transmitting elements for each computing device, and a master actuator arranged to operate the computing devices through the medium of the motion transmitting elements, each computing device and its motion transmitting elements being relatively adjustable to vary their coöperative relation.

21. The combination with a plurality of independently adjustable computing devices each including an alined series of denominational members and carrying means, of a plurality of series of idlers each constituting motion transmitting mechanism for one of the computing devices, and a master actuator common to all of the idlers and laterally movable to change its denominational position.

22. The combination with a plurality of computing devices located in different planes and relatively adjustable to permit their location in overlapping relation, each of said computing devices including a series of denominational members and carrying mechanism, an endwise movable idler bar for each computing device, a series of idlers mounted on and movable with each bar and constituting motion transmitting mechanism for the adjacent computing device, and a master actuator arranged to operate the several computing devices through the medium of the idlers.

23. The combination with paper supporting means and printing mechanism, relatively movable to change their denominational relation and to permit the printing of numbers in different columns, of a plurality of computing devices adapted to compute the totals of different columns and each including a series of denominational members and carrying means, a master actuator common to said computing devices, means for operating the actuator, and variable means for causing the movement of the actuator to be transmitted to such only of the denominational members as correspond in denominational position to the denominational positions or orders of the columns.

24. The combination with paper supporting means and printing mechanism, relatively movable to change their denominational relation and to permit the printing of numbers in different columns, a plurality of computing devices and a master actuator therefor, relatively movable to permit the denominational relation of the computing devices and actuator to correspond with the denominational relation of the paper supporting means and printing mechanism, each of said computing devices including a series of denominational members and carrying mechanism, and motion transmitting mechanism interposed between the actuator and each computing device and adjustable according to the varying widths of the columns to provide for the transmission of motion from the actuator to any desired number of denominational members of the respective computing devices.

25. The combination with a typewriting machine including a platen and printing mechanism, relatively movable, said printing mechanism including numeral keys and types, of a plurality of computing devices each including a series of denominational members and carrying mechanism, a master actuator common to said computing devices, means whereby the relative movement of the platen and printing mechanism will change the denominational relation of the computing devices and the actuator, means whereby the operation of any numeral key of the typewriter will cause a movement of the actuator corresponding in degree to the value of the key operated, and variable motion transmitting means interposed between the computing devices and the actuator to transmit motion to such only of the denominational members as correspond to the denominational positions or orders of the columns to be computed.

26. The combination with a typewriting machine including a stationary platen, a machine frame movable thereon, a carriage movable on the frame, and printing mechanism mounted on the carriage and including numeral keys, of a plurality of computing devices mounted on the frame and each including a series of denominational members and carrying mechanism, a master actuator movable with the typewriter carriage, means for causing the operation of the master actuator upon the depression of any numeral key of the typewriter, and means for transmitting movement from the master actuator to such only of the denominational members as correspond to the denominational orders or positions of the columns to be computed.

27. The combination with a typewriting machine including a stationary platen, a machine frame movable thereon, a carriage movable on the frame, and printing mechanism mounted on the carriage and including numeral keys, of a plurality of computing devices mounted on the frame each including a series of denominational members and carrying mechanism, a master actuator movable with the typewriter carriage, means for causing the said actuator to be operated upon the depression of any numeral key of the typewriter, and motion transmitting means interposed between the computing devices and the actuator and variable in accordance with the widths of the columns to be computed to cause the transmission of motion from the master actuator to such only of the denominational members as correspond to the denominational positions or orders of said columns.

28. The combination with a typewriting machine including a stationary platen, a machine frame movable thereon, a carriage movable on the frame, and printing mechanism mounted on the carriage and including numeral keys, of a plurality of computing devices mounted on the frame and each including a series of denominational members and carrying mechanism, a master actuator movable with the carriage, means for causing the operation of the actuator upon the depression of a numeral key of the typewriter, and an adjustable series of idlers interposed between each computing device and the master actuator.

29. The combination with paper supporting means and printing mechanism, relatively movable to change their denominational relation and to permit the printing of numbers in different columns, of a plurality of computing devices and a master actuator therefor, relatively movable to dispose the actuator in coöperative relation with either computing device and to change its denominational relation with respect thereto, said computing devices being relatively adjustable according to the relative location of the columns on a work sheet, and motion transmitting mechanism intermediate of the actuator and the respective computing devices and variable in accordance with the widths of the columns to be computed, to cause the transmission of motion from the actuator to such only of the denominational members as correspond to the denominational positions or orders of the columns.

30. The combination with paper supporting means and printing mechanism, relatively movable, of a plurality of computing devices and a master actuator likewise relatively movable, said computing devices being independently adjustable according to the varying location of columns on a work sheet and each including a series of denominational members and carrying mechanism, means establishing a coöperative relation between the printing mechanism and the master actuator, and separate motion transmitting mechanisms interposed between the respective computing devices and the actuator, each of said mechanisms being adjustable relative to its computing device to vary the number of denominational members to which motion will be transmitted from the actuator.

31. The combination with a typewriting machine including a platen and printing mechanism, relatively movable, said printing mechanism including a series of numeral keys, of a plurality of relatively adjustable computing devices each including a series of denominational members and carrying mechanism, a master actuator coöperatively related to the numeral keys of the typewriter, and motion transmitting mechanism interposed between the computing devices and the master actuator, said mechanism being variable to vary the number of denominational members to which motion may be transmitted from said actuator.

32. The combination with a typewriting machine including a platen and printing mechanism, relatively movable, said printing mechanism including a series of numeral keys, of a plurality of relatively adjustable computing devices each including a series of denominational members and carrying mechanism, a master actuator for said computing devices, means for causing the operation of said actuator upon the depression of a numeral key of the typewriter, and a series of adjustable idlers interposed between the master actuator and each of the computing devices.

33. The combination with a typewriting machine including a flat platen, a machine frame movable thereover, a carriage movable on the frame, and printing mechanism mounted on and movable with the carriage and including numeral keys, of a plurality of relatively adjustable computing devices mounted on the frame of the typewriter and each including a series of denominational members and carrying mechanism, a master actuator movable with the typewriter carriage and having coöperative relation with the numeral keys, and motion transmitting mechanism interposed between the computing devices and the actuator and variable to determine the number of denominational members to which motion may be transmitted by the actuator.

34. The combination with a typewriting machine including a flat platen, a machine frame movable thereover, a carriage movable on the frame, and printing mechanism mounted on the carriage and including numeral keys, of a plurality of computing devices mounted on the frame and adjustable relative to the platen, each computing device including a series of denominational members and carrying means, a master actuator movable with the typewriter carriage and coöperatively related to the numeral keys, and separate motion transmitting mechanisms interposed between the respective computing devices and the actuator, each of said mechanisms and its computing device being relatively adjustable to vary the number of denominational members to which motion may be transmitted from the actuator.

35. The combination with paper supporting means and printing mechanism, relatively movable, of a plurality of relatively adjustable computing devices located in different planes to permit the same to assume overlapping relation, each of said computing devices including a series of denominational members and carrying means, and a master actuator common to said computing devices and coöperatively related to the printing mechanism.

36. The combination with paper supporting means and printing mechanism, relatively movable, of a plurality of relatively adjustable computing devices located in different planes to permit the same to assume overlapping relation, each of said computing devices including a series of denominational members and carrying means, a master actuator common to said computing devices and coöperatively related to the printing mechanism, and adjustable motion transmitting mechanism interposed between each computing device and the actuator.

37. The combination with paper supporting means and printing mechanism, relatively movable, of a plurality of relatively adjustable computing devices located in different planes to permit the same to assume overlapping relation, each of said computing devices including a series of denominational members and carrying means, a master actuator common to said computing devices and coöperatively related to the printing mechanism, and separate motion transmitting mechanisms interposed between the respective computing devices and the master actuator and adjustable to vary the number of denominational members to which motion will be transmitted from the actuator.

38. The combination with a typewriting machine including a platen and printing mechanism, relatively movable, said printing mechanism including numeral keys, of a plurality of relatively adjustable computing devices located in different planes to permit their location in overlapping relation, and a master actuator common to said computing devices and coöperatively related to the numeral keys of the typewriter.

39. The combination with a typewriting machine including a platen and printing mechanism, relatively movable, said printing mechanism including numeral keys, of a plurality of relatively adjustable computing devices located in different planes to permit their location in overlapping relation, a master actuator common to said computing devices and coöperatively related to the numeral keys of the typewriter, and motion transmitting mechanisms interposed between the respective computing devices and the actuator, each computing device and its motion transmitting mechanism being relatively variable to vary the number of denominational members which may be operated by the actuator.

40. The combination with a typewriting machine including a platen and printing mechanism, relatively movable, said printing mechanism including numeral keys, of a plurality of relatively adjustable computing devices located in different planes to permit their location in overlapping relation, a master actuator common to said computing devices and coöperatively related to the numeral keys of the typewriter, and a series of motion transmitting idlers interposed between each computing device and the actuator, said idlers being adjustable to vary the number of denominational members which may be operated by the actuator.

41. The combination with a typewriting machine including a flat platen, a machine frame movable thereover, a carriage movable on the frame, and printing mechanism mounted on the carriage and including numeral keys, of a plurality of relatively adjustable computing devices mounted on the frame and located in different planes to permit their disposal in overlapping relation, and a master actuator common to the computing devices and coöperatively related to the numeral keys of the typewriter.

42. The combination with a typewriting machine including a flat platen, a machine frame movable thereover, a carriage movable on the frame, and printing mechanism mounted on the carriage and including numeral keys, of a plurality of relatively adjustable computing devices mounted on the frame and located in different planes to permit their disposal in overlapping relation, a master actuator common to the computing devices and coöperatively related to the numeral keys of the typewriter, and motion transmitting mechanism interposed between the computing devices and the actuator and variable to determine the number of denominational members which may be operated by the actuator.

43. The combination with a typewriting machine including a flat platen, a machine frame movable thereover, a carriage movable on the frame, and printing mechanism mounted on the carriage and including numeral keys, of a plurality of relatively adjustable computing devices mounted on the frame and located in different planes to permit their disposal in overlapping relation, a master actuator common to the computing devices and coöperatively related to the numeral keys of the typewriter, and adjustable idlers interposed between the respective computing devices and the actuator.

44. The combination with paper supporting means and printing mechanism, relatively movable, of a plurality of computing devices in overlapping relation and each including a series of denominational members and carrying means, and means for establishing a coöperative relation between the printing mechanism and the computing devices.

45. The combination with paper supporting means and printing mechanism, relatively movable, of a plurality of computing devices arranged in overlapping relation and each including a series of denominational members and carrying means, an actuator common to said computing devices and coöperatively related to the printing mechanism, and motion transmitting mechanism transmitting motion from the actuator to those denominational members of the computing devices which correspond with the denominational orders or positions of the columns to be computed, the remaining members of the computing devices permitting said devices to compute totals in excess of the denominational capacities of the columns.

46. The combination with paper supporting means and printing mechanism, relatively movable, of a plurality of overlapping computing devices each including a series of denominational members and carrying mechanism, a master actuator common to the computing devices and coöperatively related to the printing mechanism, and motion transmitting mechanism interposed between the computing devices and the master actuator and adjustable in accordance with the widths of the columns to be computed to vary the number of denominational members which may be operated by the actuator.

47. The combination with a platen and printing mechanism, relatively movable, of a plurality of overlapping computing devices each including a series of denominational members and carrying mechanism, a master actuator common to said computing devices and coöperatively related to the printing mechanism, and a series of adjustable idlers interposed between each computing device and the actuator.

48. The combination with a typewriting machine including a platen and printing mechanism, relatively movable, said printing mechanism including numeral keys, of a plurality of overlapping computing devices each including a series of denominational members and carrying means, and a master actuator common to said computing devices and coöperatively related to the numeral keys of the typewriter.

49. The combination with a typewriting machine including a platen and printing mechanism, relatively movable, said printing mechanism including numeral keys, of a plurality of overlapping computing devices each including a series of denominational members and carrying mechanism, an actuator common to said computing devices and coöperatively related to the keys of the typewriter, and motion transmitting mechanism intermediate of the computing devices and the actuator, said motion transmitting mechanism being adjustable to vary the number of denominational members which may be operated by the actuator.

50. The combination with a typewriter including a platen and printing mechanism, relatively movable, said printing mechanism including a series of numeral keys, of a plurality of overlapping computing devices each including a series of denominational members and carrying mechanism, a master actuator common to said computing devices and coöperatively related to the numeral keys of the typewriter, and a series of adjustable idlers interposed between each computing device and the actuator.

51. The combination with a typewriting machine including a flat platen, a machine frame movable thereover, a carriage movable on the frame, and printing mechanism mounted on the carriage and including numeral keys, of a plurality of overlapping computing devices mounted on the frame, and each including a series of denominational members and carrying mechanism, and a master actuator common to said computing devices and coöperatively related to the numeral keys of the typewriter.

52. The combination with a typewriting machine including a flat platen, a machine frame movable thereover, a carriage movable on the frame, and printing mechanism mounted on the carriage and including numeral keys, of a plurality of overlapping computing devices mounted on the frame, and each including a series of denominational members and carrying mechanism, a master actuator common to said computing devices and coöperatively related to the numeral keys of the typewriter, and motion transmitting mechanism interposed between the actuator and the respective computing devices, said computing devices and the motion transmitting mechanism being relatively variable to vary the number of denominational members which may be operated by the actuator.

53. The combination with a typewriting machine including a flat platen, a machine frame movable thereover, a carriage movable on the frame, and printing mechanism mounted on the carriage and including numeral keys, of a plurality of overlapping computing devices mounted on the frame, and each including a series of denominational members and carrying mechanism, a master actuator common to said computing devices and coöperatively related to the numeral keys of the typewriter, and motion transmitting mechanism for transmitting motion from the actuator to such of the denominational members as correspond to the denominational positions or orders of the columns to be computed, the remaining denominational members serving to permit the computation of totals exceeding the denominational capacities of the columns.

54. The combination with a typewriting machine including a flat platen, a machine frame movable thereover, a carriage movable on the frame, and printing mechanism mounted on the carriage and including numeral keys, of a plurality of overlapping computing devices mounted on the frame, and each including a series of denominational members and carrying mechanism, a master actuator common to said computing devices and coöperatively related to the numeral keys of the typewriter, and a series of adjustable idlers interposed between each computing device and the actuator.

55. The combination with a typewriting machine including a platen and printing mechanism, relatively movable, said printing mechanism including numeral keys, of a support adjustable relative to the platen and parallel with the lines of writing, a plurality of computing devices mounted on the support and relatively adjustable, and means for operating the computing devices from the numeral keys of the typewriter, the adjustment of the support serving to effect a general adjustment of the computing devices, according to the location of the columns on the work sheet, and the relative adjustment of the computing devices serving to adjust the same according to the relative positions of the columns.

56. The combination with a typewriting machine including as primary elements thereof, a machine frame and a traveling carriage and also including printing mechanism having numeral keys, of a support mounted on one of the primary elements of the typewriter and adjustable parallel with the travel of the carriage, a plurality of computing devices mounted on the adjustable support, and means for operating said computing devices from the numeral keys of the typewriter.

57. The combination with a typewriter including as primary elements thereof a machine frame and a traveling carriage and also including printing mechanism having numeral keys, a support carried by one of the primary elements of the typewriter and adjustable parallel with the travel of the carriage, a plurality of relatively adjustable computing devices mounted on the support and each including a series of denominational members and carrying mechanism, and means establishing a coöperative relation between the computing devices and the numeral keys of the typewriter.

58. The combination with a typewriting machine including a flat platen, a machine frame movable thereover, a carriage movable on the frame, and printing mechanism mounted on the carriage and including numeral keys, of a support adjustable transversely of the platen on the machine frame, and a plurality of computing devices mounted on said support and each including a series of denominational members and carrying mechanism, said computing devices being coöperatively related to the numeral keys of the typewriter.

59. The combination with a typewriting machine including a flat platen, a machine frame movable thereover, a carriage movable on the frame, and printing mechanism mounted on the carriage and including numeral keys, of a support adjustable transversely of the platen on the machine frame, and a plurality of computing devices mounted on said support and each including a series of denominational members and carrying mechanism, said computing devices being coöperatively related to the numeral keys of the typewriter and relatively adjustable transversely of the platen.

60. The combination with a typewriting machine including a flat platen, a machine frame movable thereover, a carriage movable on the frame, and printing mechanism mounted on the carriage and including numeral keys, of a support adjustable transversely of the platen on the machine frame, and a plurality of computing devices mounted on said support and each including a series of denominational members and carrying mechanism, said computing devices being coöperatively related to the numeral keyes of the typewriter and independently adjustable on the support.

61. The combination with a typewriting machine including a flat platen, a machine frame movable thereover, a carriage movable on the frame, and printing mechanism mounted on the carriage and including numeral keys, of a support adjustable transversely of the platen on the machine frame, and a plurality of overlapping computing devices mounted on the support and coöperatively related to the numeral keys of the typewriter.

62. The combination with a typewriting machine including a flat platen, a machine frame movable thereover, a carriage movable on the frame, and printing mechanism mounted on the carriage and including numeral keys, of a support adjustable transversely of the platen on the machine frame, and a plurality of overlapping computing devices mounted on the support and coöperatively related to the numeral keys of the typewriter, said computing devices being relatively adjustable to vary the extent of their overlapping relation.

63. The combination with a typewriting machine including a flat platen, a machine frame movable thereover, a carriage movable on the frame, and printing mechanism mounted on the carriage and including numeral keys, of a support adjustably mounted on the frame, a plurality of computing devices mounted on the support and each including a series of denominational members and carrying mechanism, a master actuator common to the computing devices and coöperatively related to the numeral keys, and motion transmitting mechanism carried by the adjustable support and interposed between the computing devices and the actuator.

64. The combination with a typewriting machine including a flat platen, a machine frame movable thereover, a carriage movable on the frame, and printing mechanism mounted on the carriage and including numeral keys, of a support adjustably mounted on the frame, a plurality of computing devices mounted on the support and each including a series of denominational members and carrying mechanism, a master actuator common to the computing devices and coöperatively related to the numeral keys, and motion transmitting mechanism carried by the adjustable support and interposed between the computing devices and the actuator, said motion transmitting mechanism and the computing mechanisms being relatively variable to vary the number of denominational members which may be operated by the actuator.

65. The combination with a typewriting machine including a flat platen, a machine frame movable thereover, a carriage movable on the frame, and printing mechanism mounted on the carriage and including numeral keys, of a support adjustable transversely of the platen on the machine frame, a plurality of computing devices mounted on the support and each including a series of denominational members and transfer mechanism, an actuator common to the computing devices and coöperatively related to the keys of the typewriter, and an adjustable series of idlers interposed between each computing device and the actuator.

66. The combination with a typewriting machine including a flat platen, a machine frame movable thereover, a carriage movable on the frame, and printing mechanism mounted on the carriage and including numeral keys, of a support adjustable transversely of the platen on the machine frame, a plurality of computing devices independently adjustable on the support and each including a series of denominational members and carrying mechanism, an independently adjustable series of motion transmitting idlers for each computing device, and an actuator arranged to operate the several computing devices through the medium of the idlers and coöperatively related to the numeral keys of the typewriter.

67. In a computing mechanism, the combination with a master wheel, of a plurality of computing devices distributed about the axial plane of the master wheel, and each including a series of denominational members, said master wheel and each computing device having relative lateral movement to change their denominational relation.

68. In a computing mechanism, the combination with an arcuate series of computing devices, each including a series of denominational members of a common actuator therefor mounted to swing from the center of the arc upon which the computing devices rest, and arranged to operate successive members of each device.

69. In a computing mechanism, the combination with an arcuate series of computing devices arranged in overlapping relation, of an actuator common to said computing devices and mounted concentric with the arcuate series thereof.

70. In a computing mechanism, the combination with a rotary actuator, of a series of computing devices disposed equidistant from the axis of the actuator and each including a series of denominational members, and motion transmitting mechanism interposed between the computing devices and the actuator, and variable to determine the members to be operated.

71. In a computing mechanism, the combination with a master wheel, of an arcuate series of computing devices concentric therewith and each including a series of denominational members and carrying mechanism, and idlers interposed between the computing devices and the master wheel, the end of each computing device extending beyond the end of the adjacent computing device.

72. In a computing mechanism, a plurality of sets of denominational members, the members of each set being alined and the several sets being arranged out of alinement, a plurality of alined motion transmitting devices for the denominational members of the several sets, and a master actuator presentable to successive motion transmitting devices.

73. In a computing mechanism, a plurality of denominational members certain of which have their axes in alinement with each other and out of alinement with the axes of certain other of the members, motion transmitting elements one for each denominational member, and a master actuator arranged to engage and actuate the several motion transmitting elements one at a time.

74. In a computing mechanism, a plurality of denominational members certain of which have their axes in alinement with each other and out of alinement with the axes of certain other of the members, motion transmitting elements one for each denominational member, and a master actuator having a rectilinear lateral movement to present the same in coöperative relation with successive motion transmitting elements.

75. In a combined typewriting and adding machine, the combination with a platen and printing mechanism relatively movable to permit numbers to be printed in different fields or columns, of an adding mechanism including a plurality of registers each including a series of denominational members and carrying means, each register being appropriated to a different adding field and at least one of said registers having a greater number of denominational members than there are denominational positions in the column to which it is appropriated, and means for establishing a coöperative relation between the typewriter keys and such only of the denominational members as correspond to the denominational positions of the columns, the remaining members being inoperative except through the medium of the carrying mechanism.

76. In a combined typewriting and adding machine including a platen and printing mechanism, relatively movable to permit numbers to be printed in two closely adjacent or side by side columns or fields, a register having denominational members, a master means located opposite different members of the register when digits are printed in different columns, and means for causing the register to be operated from the master means when digits are printed in one of the columns, said register being inoperative by the master means when digits are printed in the other column.

77. A combined typewriting and adding machine, including a platen and printing mechanism, relatively movable, and keys, a computing device including a series of denominational members, an actuator coöperatively related to the keys, and selective mechanism intermediate of the actuator and the computing device and variable to determine the members to be operated.

78. In a recording and adding machine, the combination with keys, and printing mechanism coöperatively related thereto, of means for automatically adding each of a plurality of columns of numbers and variable means for regulating the number of denominations in which numbers may be printed and added in the respective columns.

79. In a computing machine, the combination with a master actuator, of a series of relatively independent computing devices each including a series of denominational members and carrying means, of motion transmitting mechanism interposed between the actuator and the several computing devices.

In testimony, that I claim the foregoing as my own, I have hereto affixed my signature in the presence of two witnesses.

LOUIS G. JULIHN.

Witnesses:
JOHN H. SIGGERS,
BLANCHE J. KALDENBACK.